(12) United States Patent  (10) Patent No.: US 8,631,700 B2
Sammoura et al.  (45) Date of Patent: Jan. 21, 2014

(54) RESONATING SENSOR WITH MECHANICAL CONSTRAINTS

(75) Inventors: Firas N. Sammoura, Melrose, MA (US); William D. Sawyer, Arlington, MA (US)

(73) Assignee: Analog Devices, Inc., Norwood, MA (US)

( * ) Notice: Subject to any disclaimer, the term of this patent is extended or adjusted under 35 U.S.C. 154(b) by 218 days.

(21) Appl. No.: 12/940,354

(22) Filed: Nov. 5, 2010

(65) Prior Publication Data

US 2012/0111112 A1    May 10, 2012

(51) Int. Cl.
*G01C 19/56*    (2012.01)

(52) U.S. Cl.
USPC ..................................... 73/504.12

(58) Field of Classification Search
USPC ............. 73/504.01, 504.02, 504.12, 504.13
See application file for complete search history.

(56) References Cited

U.S. PATENT DOCUMENTS

| | | | |
|---|---|---|---|
| 4,655,081 A | 4/1987 | Burdess | 73/505 |
| 4,809,589 A | 3/1989 | Bertrand | 92/98 R |
| 5,177,579 A | 1/1993 | Jerman | 73/724 |
| 5,383,362 A | 1/1995 | Putty et al. | 73/505 |
| 5,450,751 A | 9/1995 | Putty et al. | 73/504.18 |
| 5,589,082 A | 12/1996 | Lin et al. | 216/2 |
| 5,616,864 A | 4/1997 | Johnson et al. | 73/504.04 |
| 5,750,899 A | 5/1998 | Hegner et al. | 73/756 |
| 5,767,405 A | 6/1998 | Bernstein et al. | 73/504.16 |
| 5,783,749 A | 7/1998 | Lee et al. | 73/504.12 |
| 5,937,275 A | 8/1999 | Munzel et al. | 438/50 |
| 5,992,233 A | 11/1999 | Clark | 73/514.35 |
| 6,151,964 A | 11/2000 | Nakajima | 73/504.13 |
| 6,209,393 B1 | 4/2001 | Tomikawa et al. | 73/504.12 |
| 6,240,781 B1 | 6/2001 | Namerikawa | 73/504.13 |
| 6,401,534 B1 | 6/2002 | Fell et al. | 73/504.13 |
| 6,438,242 B1 | 8/2002 | Howarth | 381/190 |
| 6,635,509 B1 | 10/2003 | Ouellet | 438/106 |
| 6,848,305 B2 | 2/2005 | Fell et al. | 73/504.13 |
| 6,877,374 B2 | 4/2005 | Geen | 73/504.14 |
| 6,892,575 B2 | 5/2005 | Nasiri et al. | 73/504.12 |
| 6,958,566 B2 | 10/2005 | Nguyen et al. | 310/321 |

(Continued)

FOREIGN PATENT DOCUMENTS

| | | | | |
|---|---|---|---|---|
| EP | 0860685 | 8/1998 | | G01C 19/56 |
| EP | 1788385 | 5/2007 | | G01N 29/02 |

(Continued)

OTHER PUBLICATIONS

H. Johari, Micromachined Capacitive Silicon Bulk Acoustic Wave Gyroscopes, dissertation [online], Georgia Institute of Technology, Dec. 2008, pp. 32-35 and 133-136 [retrieved on Apr. 16, 2013 from the Internet: https://smartech.gatech.edu].*

(Continued)

*Primary Examiner* — John Chapman, Jr.
(74) *Attorney, Agent, or Firm* — Sunstein Kann Murphy & Timbers LLP

(57) ABSTRACT

A method and apparatus for sensing movement resonates a primary member in a flexure mode at a given frequency, thus causing the primary member to have top and bottom portions that resonate at substantially about zero Hertz. The method also secures the bottom portion to a first substrate, and mechanically constrains the top portion while resonating in the flexure mode to substantially eliminate vibrations in the top portion. Finally, the method generates a changing capacitance signal in response to movement of the primary member. When generating this changing capacitance signal, the primary member resonates in a bulk mode at a given frequency.

20 Claims, 6 Drawing Sheets

(56) References Cited

U.S. PATENT DOCUMENTS

| | | | |
|---|---|---|---|
| 6,985,051 B2 | 1/2006 | Nguyen et al. | 333/186 |
| 7,032,451 B2 | 4/2006 | Geen | 73/504.14 |
| 7,043,985 B2 | 5/2006 | Ayazi et al. | 73/504.04 |
| 7,051,590 B1 | 5/2006 | Lemkin et al. | 73/504.04 |
| 7,089,792 B2 | 8/2006 | Geen | 73/504.14 |
| 7,178,378 B2 | 2/2007 | Crawley et al. | 73/24.06 |
| 7,204,144 B2 | 4/2007 | Geen | 73/504.14 |
| 7,216,539 B2 | 5/2007 | Geen | 73/504.14 |
| 7,357,025 B2 | 4/2008 | Geen | 73/504.12 |
| 7,420,318 B1 | 9/2008 | Pulskamp | 310/328 |
| 7,427,819 B2 | 9/2008 | Hoen et al. | 310/320 |
| 7,492,241 B2 | 2/2009 | Piazza et al. | 333/189 |
| 7,543,496 B2 * | 6/2009 | Ayazi et al. | 73/504.12 |
| 7,551,043 B2 | 6/2009 | Nguyen et al. | 333/186 |
| 7,581,443 B2 | 9/2009 | Kubena et al. | 73/504.12 |
| 7,637,156 B2 | 12/2009 | Araki et al. | 73/504.13 |
| 7,874,209 B2 | 1/2011 | Stewart | 73/504.01 |
| 7,895,892 B2 | 3/2011 | Aigner | 73/504.01 |
| 8,056,413 B2 | 11/2011 | Yazdi | 73/504.13 |
| 8,166,816 B2 | 5/2012 | Ayazi et al. | 73/504.12 |
| 2003/0119220 A1 | 6/2003 | Mlcak et al. | 438/52 |
| 2003/0183888 A1 | 10/2003 | Bar-Sadeh et al. | 257/419 |
| 2004/0051595 A1 | 3/2004 | Yoshimine et al. | 331/158 |
| 2004/0085000 A1 | 5/2004 | Ogiura | 310/329 |
| 2005/0072230 A1 | 4/2005 | Koike et al. | 73/504.12 |
| 2005/0148065 A1 | 7/2005 | Zhang et al. | 435/287.2 |
| 2006/0133953 A1 | 6/2006 | Zhang et al. | 422/58 |
| 2006/0196253 A1 | 9/2006 | Crawley et al. | 73/53.01 |
| 2006/0197411 A1 | 9/2006 | Hoen et al. | 310/320 |
| 2006/0237806 A1 | 10/2006 | Martin et al. | 257/415 |
| 2006/0238078 A1 | 10/2006 | Liu | 310/330 |
| 2007/0046398 A1 | 3/2007 | Nguyen et al. | 333/186 |
| 2007/0172940 A9 | 7/2007 | Manalis et al. | 435/287.2 |
| 2007/0220971 A1 | 9/2007 | Ayazi et al. | 73/504.02 |
| 2007/0256495 A1 | 11/2007 | Watson | 73/504.12 |
| 2007/0284971 A1 | 12/2007 | Sano et al. | 310/364 |
| 2008/0054759 A1 | 3/2008 | Ayazi et al. | 310/309 |
| 2008/0190181 A1 | 8/2008 | Khuri-Yakub et al. | 73/64.53 |
| 2008/0282833 A1 | 11/2008 | Chaumet | 74/5 R |
| 2009/0095079 A1 | 4/2009 | Ayazi | 73/514.29 |
| 2009/0114016 A1 | 5/2009 | Nasiri et al. | 73/504.12 |
| 2009/0173157 A1 | 7/2009 | Stewart | 73/504.13 |
| 2009/0173158 A1 | 7/2009 | Gehring | 73/590 |
| 2009/0188317 A1 | 7/2009 | Aigner | 73/504.01 |
| 2009/0266162 A1 | 10/2009 | Ayazi et al. | 73/504.12 |
| 2009/0277271 A1 | 11/2009 | Seppa et al. | 73/627 |
| 2010/0058861 A1 | 3/2010 | Kuang et al. | 73/504.12 |
| 2010/0148341 A1 | 6/2010 | Fuji et al. | 257/686 |
| 2010/0263445 A1 | 10/2010 | Hayner et al. | 73/504.12 |
| 2010/0294039 A1 | 11/2010 | Geen | 73/504.12 |
| 2011/0192226 A1 | 8/2011 | Hayner et al. | 73/504.12 |
| 2011/0254599 A1 | 10/2011 | Dikshit et al. | 327/156 |
| 2012/0013774 A1 | 1/2012 | Kim et al. | 348/246 |
| 2012/0111112 A1 | 5/2012 | Sammoura et al. | 73/514.01 |
| 2012/0111113 A1 | 5/2012 | Sammoura et al. | 73/514.01 |
| 2012/0112765 A1 | 5/2012 | Sparks et al. | 324/633 |
| 2012/0137773 A1 | 6/2012 | Judy et al. | 73/504.12 |
| 2012/0195797 A1 | 8/2012 | Sparks et al. | 422/69 |
| 2012/0227487 A1 | 9/2012 | Ayazi et al. | 73/504.08 |

FOREIGN PATENT DOCUMENTS

| | | | |
|---|---|---|---|
| EP | 2 078 925 | 7/2009 | G01C 19/56 |
| EP | 2216904 | 8/2010 | H03H 9/25 |
| JP | 9116250 | 5/1997 | H05K 1/18 |
| JP | 2004 301734 | 10/2004 | G01C 19/56 |
| WO | WO 2007/061610 | 5/2007 | H01L 41/08 |
| WO | WO 2009/066640 | 5/2009 | H03H 9/25 |

OTHER PUBLICATIONS

Ayazi, "Intergrated Solutions for Motion Sensing in Handheld Devices," Qualtré Inc., http://www.qualtre.com/motion-sensing-technology/, Oct. 2010, 3 pages.

Ayazi et al., "High Aspect-Ratio Combined Poly and Single-Crystal Silicon (HARPSS) MEMS Technology;" Journal of Microelectromechanical Systems, vol. 9, No. 3, Sep. 2000.

Ayazi et al., "Design and Fabrication of A High-Performance Polysilicon Vibrating Ring Gyroscope;" Center for Integrated Sensors and Circuits; Eleventh IEEE/ASME International Workshop on Micro Electro Mechanical Systems, Heidelberg, Germany, Jan. 25-29, 1998.

Ayazi et al., "A HARPSS Polysilicon Vibrating Ring Gyroscope;" Journal of Microelectromechanical Systems, vol. 10, No. 2, Jun. 2001.

Benes et al., "Comparison Between BAW and SAW Sensor Principles," IEEE Transactions on Ultrasonics, Ferroelectrics and Frequency Control, vol. 45 No. 5, Sep. 1998, pp. 1314-1330, 17 pages.

Bernstein, "An Overview of MEMS Inertial Sensing Technology," Sensors, http://www.sensorsmag.com/sensors/acceleration-vibration/an-overview-mems-inertial-sensing-technology-970, Feb. 1, 2003, 6 pages.

Celikel et al., "Optoelectronic Design Parameters of Interferometric Fiber Optic Gyroscope with LiNbO3 Having North Finder Capability and Earth Rotation Rate Measurement," Indian Journal of Pure & Applied Physics, vol. 48, pp. 375-384, Jun. 2010, 10 pages.

Doe, "Qualtré Targets 3-Axis Gyro Market with Alternative Technology," MEMS Trends, Issue No. 3, pp. 8, Jul. 2010, 1 page.

Drafts, "Acoustic Wave Technology Sensors," Sensors (www.sensorsmag.com), 5 pages, Oct. 1, 2000.

Dubois, "Thin film bulk acoustic wave resonators: a technology overview," MEMSWAVE 03, Toulouse, France, 4 pages, Jul. 2-4, 2003.

Geen et al., New iMEMS® Angular-Rate-Sensing Gyroscope; ADI Micromachined Products Division; Analog Dialogue 37-7 (2003).

Johari, "Micromachined Capacitive Silicon Bulk Acoustic Wave Gyroscopes," A Dissertation Presented to the Academic Faculty in Partial Fulfillment of the Requirements for the Degree Doctor of Philosophy in the School of Mechanical Engineering Georgia Institute of Technology, Dec. 2008, 201 pages.

Johari et al., "High-Frequency Capacitive Disk Gyroscope in (100) and (111) Silicon," School of Electrical and Computer Engineering, Georgia Institute of Technology, MEMS 2007, pp. 47-50, Jan. 2007, 4 pages.

Johari et al., "Capacitive Bulk Wave Silicon Disk Gyroscopes," Electron Devices Meeting, 2006, Dec. 1, 2006, 4 pages.

Johnson, "Qualtre Preps Solid State MEMS Gyros," MEMS Investor Journal, http://www.memsinvestorjournal.com/2010/04/qualtre-preps-solidstate-mems-gyros.html_, Apr. 8, 2010, 2 pages.

Link, "Angular Rate Detector DAVED®-RR," Application Report SE 090.2; Institute of Micromachining and Information Technology, 1 page, Dec. 11, 2007, http://hsgimit.de/fileadmin/gfx/pdfs/AnwendungsberichtSE090 _2rr_englisch_V1.pdf.

Link, "Angular Rate Detector DAVED®-LL," Application Report SE 100.1; Institute of Micromachining and Information Technology, 1 page, Dec. 11, 2007,hsg-imit.de/fileadmin/gfx/pdfs/anwendungsberichtse100_ 111_englisch01.pdf.

Nasiri, "A Critical Review of MEMS Gyroscopes Technology and Commercialization Status," InvenSense, 8 pages, 2005, www.scantec.de/uploads/mdia/MEMSGyroComp_02.pdf.

Ramirez, "PZE Energy Harvester," 45 RF MEMS Based Circuit Design—conocimeintos.com.ve, http://conocimientosrfmemsdesign.blogspot.com/2010/07/pze-energy-harvester.html, Jul. 24, 2010, 4 pages.

Satrom et al., "Disc Resonating Gyroscopes: A Summary of a Recent Development in MEMS Technology," Northwestern University, http://www.google.com/url?sa=t&rct=j&q=&esrc=s&frm=1&source=web&cd=1&sqi=2&ved=0CCQQFjAA&url=http%3A%2F%2Fclifton.mech.northwestern.edu%2F~me381%2Fproject%2F06fall%2FFruthSatrom.pdf&ei=ZOsyT6D3IMjMrQfE6qSnDA&usg=AFQjCNFXOj00sAsF6bMdfEV70D7JzzLkBw&sig2=jwpU1Tgot45sT_fgi81zMw, Dec. 1, 2006, 15 pages.

Saukoski, "System and Circuit Design for a Capacitive MEMS Gyroscope," Doctoral Dissertation, TKK Dissertations 116, Helsinki University of Technology, 279 pages (2008).

(56) References Cited

OTHER PUBLICATIONS

Yang et al., "An electro-thermal bimorph-based microactuator for precise track-positioning of optical disk drives;" J. Micromech. Microeng., v. 15 (2005) 958-965 Journal of Micromechanics and Microengineering.

Jonathan Grant, Third Party Submission under 37 C.F.R. § 1.290 for U.S. Appl. No. 12/983,476, 8 pages, dated Nov. 6, 2012.

Jonathan Grant, Third Party Submission under 37 C.F.R. § 1.290 for U.S. Appl. No. 13/308,687, 8 pages, dated Nov. 6, 2012.

International Searching Authority, International Search Report and Written Opinion—International Application No. PCT/US2009/056456, Feb. 16, 2010, 18 pages.

International Searching Authority, International Search Report and Written Opinion—International Application No. PCT/US2010/044994, dated Nov. 3, 2010, 11 pages.

International Searching Authority, Invitation to Pay Additional Fees and, Where Applicable, Protest Fee; European Patent Office, International Application No. PCT/US2011/062966, 6 pages, dated Feb. 3, 2012.

International Searching Authority, International Search Report and Written Opinion, International Application No. PCT/US2011/062966, Apr. 12, 2012, 15 pages.

International Searching Authority, Invitation to Pay Additional Fees and, Where Applicable, Protest Fee, International Application No. PCT/US2011/062961, May 8, 2012, 8 pages.

International Searching Authority, International Search Report and Written Opinion, International Application No. PCT/US2011/058908, Apr. 12, 2012, 15 pages.

\* cited by examiner

RESONATING SENSOR WITH MECHANICAL CONSTRAINTS

TECHNICAL FIELD

The invention generally relates to bulk acoustic wave sensors and, more particularly, the invention relates to improving the response and signal of bulk acoustic wave sensors.

BACKGROUND ART

Bulk acoustic wave ("BAW") gyroscope use has increased in recent years. This trend is driven by their many benefits including, among other things, their high gain factor, which causes them to use less power than conventional gyroscopes. In addition, such gyroscopes generally cost less to manufacture.

To those ends, many bulk acoustic wave gyroscopes known to the inventors have a disk with a crystal lattice that, during either or both an actuation or detection phase, vibrates/resonates at a very high frequency, typically in the megahertz range. This is in contrast to gyroscopes having a disk mechanically moving back and forth about a substrate in both phases. When the crystal lattice of the disk vibrates, the disk is considered to be operating in a "bulk" mode.

To provide support, the disk of a BAW gyroscope is anchored to and suspended above a base substrate. When subjected to certain motion (e.g., a rotation), the shape of the disk changes in a known manner. Circuitry detects this change in shape to provide the information of interest, such as the amount and type of motion detected.

SUMMARY OF THE INVENTION

In accordance with one embodiment of the invention, a bulk acoustic wave sensor has top and bottom substrates, and a primary member between the two substrates. The primary member, which has top and bottom sides, is configured to resonate in a flexure mode in response to receipt of an electrostatic signal. The primary member also is configured to operate in a bulk mode when rotated. The bottom substrate has a bottom support portion securing it to the bottom side of the primary member. In a corresponding manner, the top substrate has a top support portion securing it to the top side of the primary member.

The primary member may be configured to resonate in a flexure mode to cause a given top portion of its top surface to resonate substantially at about zero Hertz. Thus, in some embodiments, the top support portion is secured to the given top portion. Other embodiments secure the bottom support to the given bottom portion. The bottom substrate and top substrate also may form a hermetically sealed chamber to hermetically seal the primary member. In that case, the sensor (e.g., which may be an inertial sensor) may have a plurality of electrodes within the chamber to capacitively actuate the primary member. The sensor also may have a plurality of pads electrically connected with the plurality of electrodes and outside of the chamber.

The top support may be formed from the same material as that of its corresponding top substrate, while the bottom support may be formed from the same material as that of its corresponding bottom substrate (e.g., silicon or polysilicon). Moreover, in illustrative embodiments, the bottom substrate has more than one support portion. Specifically, the bottom substrate may have a plurality of bottom support portions that are symmetrically arranged with respect to the primary member.

In accordance with another embodiment of the invention, a MEMS bulk resonating gyroscope has a bottom substrate secured to a primary member that is configured to resonate in a flexure mode in response to receipt of an electrostatic signal. The primary member also is configured to respond to rotation in a bulk mode. The sensor also has a bottom support portion securing the bottom substrate to the bottom side of the primary member. Moreover, the top side of the primary member has a constrained portion that is mechanically constrained to resonate at substantially about zero Hertz when resonating in the flexure and bulk modes.

In accordance with other embodiments of the invention, a method of sensing movement resonates a primary member in a flexure mode at a given frequency, thus causing the primary member to have top and bottom portions that resonate at substantially about zero Hertz. The method also secures the bottom portion to a first substrate, and mechanically constrains the top portion while resonating in the flexure mode to substantially eliminate vibrations in the top portion. Finally, the method generates a changing capacitance signal in response to movement of the primary member. When generating this changing capacitance signal, the primary member resonates in a bulk mode at a given frequency.

The given frequency may be the resonant frequency of the primary member. Moreover, the method may mechanically constrain by securing a second substrate to the top portion. Alternative embodiments hermetically seal the primary member in a chamber, while some embodiments cause the changing capacitance signal to indicate a movement change in at least 2 dimensions.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 2 is rotated 180 degrees from FIG. 3, which is oriented appropriately for use of the terms "top" and "bottom."

DESCRIPTION OF ILLUSTRATIVE EMBODIMENTS

In illustrative embodiments, a bulk acoustic wave (BAW) inertial sensor is configured to minimize undesired vibrations that reduce its signal-to-noise ratio. To that end, the inertial sensor has a vibrating disk mechanically secured on both its top and bottom sides. The inventors discovered that this dual securing arrangement reduces vibration, thus improving the output signal. Details of illustrative embodiments are discussed below.

Figure 1:
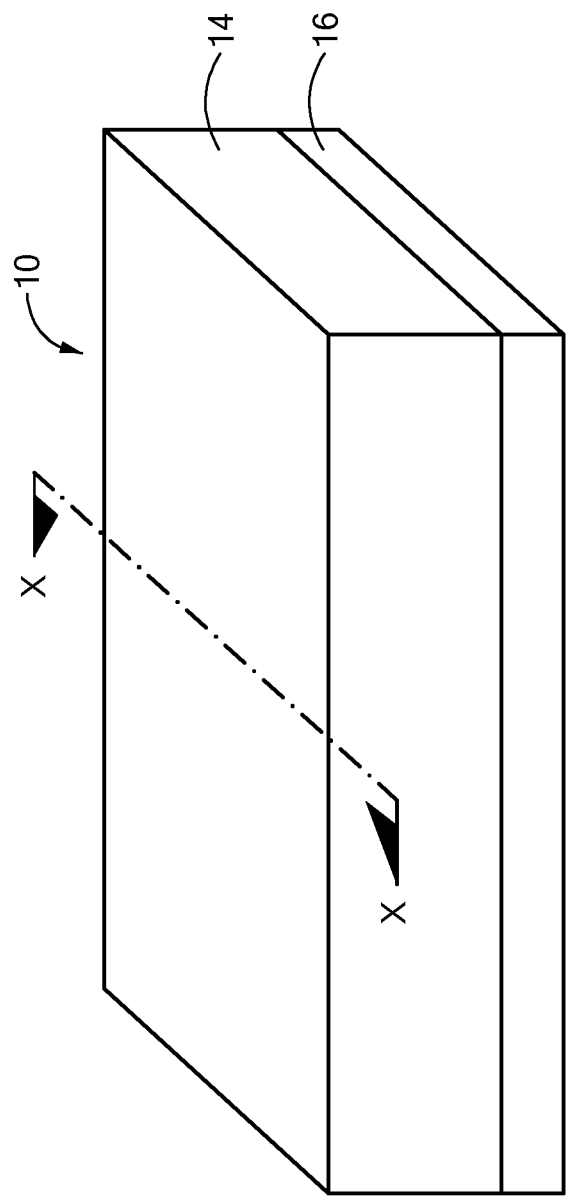
FIG. 1 schematically shows a perspective view of a packaged inertial sensor having a bulk acoustic wave gyroscope configured in accordance with illustrative embodiments of the invention.

FIG. 1 schematically shows a perspective view of a packaged inertial sensor 10 having a bulk acoustic wave gyroscope 12 (FIG. 2 and others, discussed below) configured in accordance with illustrative embodiments of the invention. This package protects its interior gyroscope 12 from the environment. As shown, the package has a top portion 14 that connects with a bottom portion 16 to form an interior (not shown) for containing the gyroscope 12. Although not necessary, some embodiments of the invention hermetically seal the package interior. Other embodiments of the package, however, do not provide a hermetic seal.

The package can be any of a variety of different types, such as, among other things, a pre-molded leadframe package, a substrate package, or a ceramic package. The top portion 14 and/or the bottom portion 16 can be planar or form a cavity. In either case, the top and bottom portions 14 and 16 should appropriately couple to protect the gyroscope 12. For example, if the top portion 14 is flat, then the bottom portion 16 should have a cavity, or there should be some spacing apparatus to form the interior with an appropriate volume for containing the gyroscope 12.

In alternative embodiments, the package is a conventional post-molded, plastic leadframe package. Specifically, as known by those skilled in the art, this relatively inexpensive package type molds plastic, in liquid form, directly around the gyroscope die 12. This packaging process therefore can damage the gyroscope 12 if it is not properly sealed. In that case, the sensitive microstructure within the gyroscope 12 preferably is hermetically sealed or otherwise protected from the molding process.

It should be noted that although this discussion focuses on a gyroscope, some embodiments apply to other types of inertial sensors that operate under similar principles; namely, at least partly in a bulk mode. For example, illustrative embodiments also may apply to accelerometers. Discussion of bulk acoustic wave gyroscopes, and the specific configuration of such gyroscopes, is for illustrative purposes only and not intended to limit all embodiments of the invention.

The packaged gyroscope 10 may be used in any number of different applications. For example, it could be part of a larger guidance system in an aircraft, or part of a satellite sensor in an automobile that cooperates with a stabilization system to maintain a smooth ride. To those ends, the packaged gyroscope 10 has a plurality of interfaces (not shown) for communicating with exterior components.

To those ends, the packaged gyroscope 10 may have a plurality of pins (not shown) on its bottom, top, and/or side surfaces for making a mechanical and electrical connection with an underlying system, such as a printed circuit board. Alternatively, the package may have a plurality of pads (not shown) for surface mounting the package to an underlying printed circuit board. Conventional soldering techniques should suffice to make this connection. The printed circuit board may have additional components that interact with the device to both control the gyroscope die 12, and receive output signals indicating rotational acceleration of the overall system. For example, the printed circuit board also may have one or more application-specific integrated circuits (ASICs) and other circuit devices for controlling operation.

Figure 2:
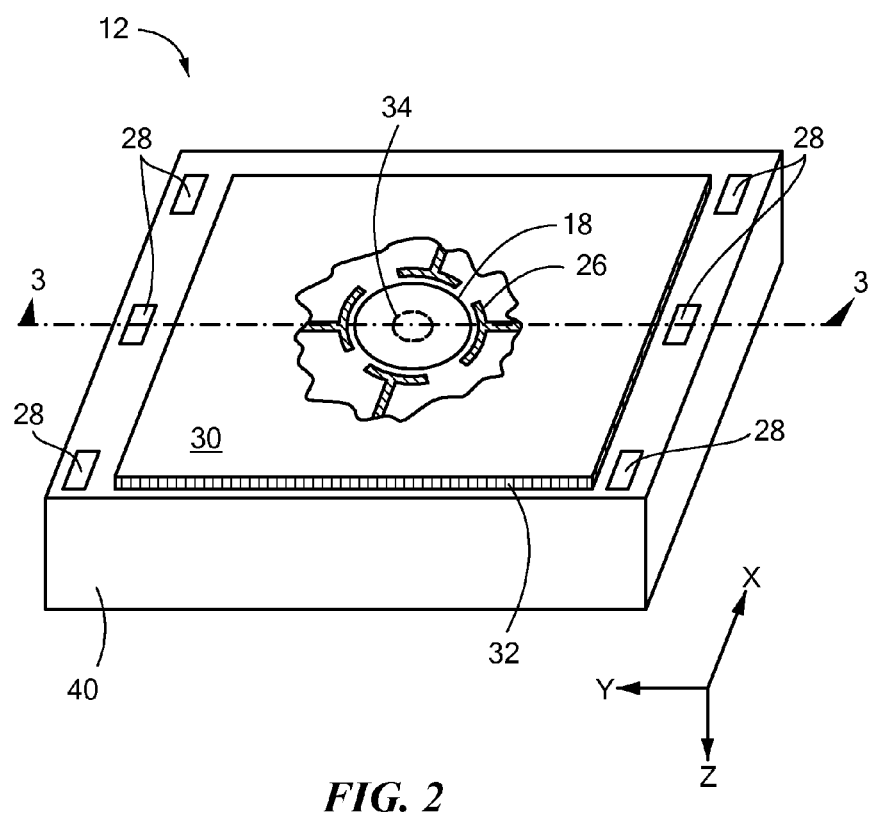
FIG. 2 schematically shows a perspective view of a bulk acoustic wave gyroscope configured in accordance with illustrative embodiments of the invention. This figure has a partial cutaway view to show the vibrating disk.
Figure 3:
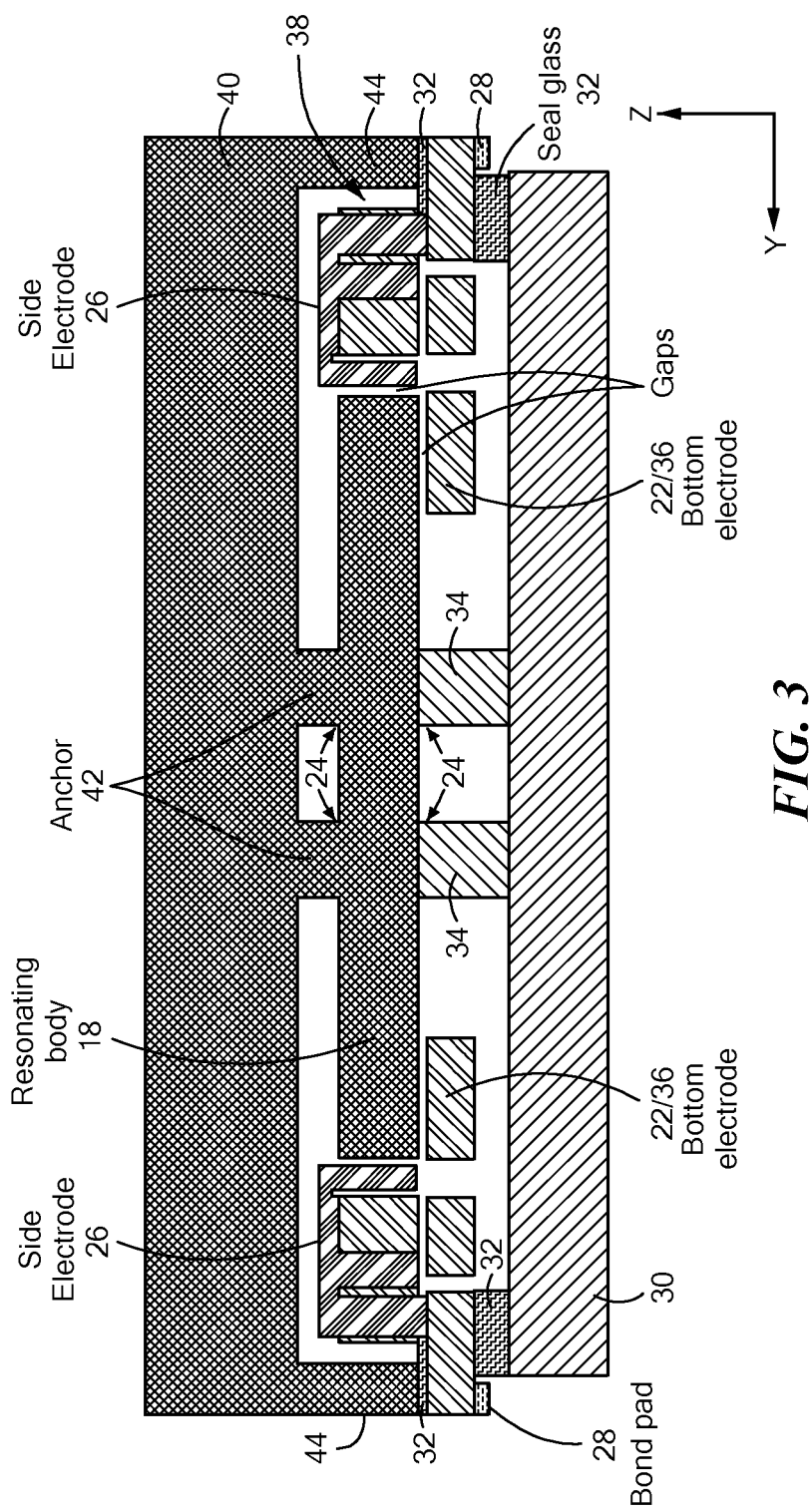
FIG. 3 schematically shows a cross-sectional view of the bulk acoustic wave gyroscope of FIG. 2 along line 3-3.

FIG. 2 schematically shows a perspective view of a bulk acoustic wave gyroscope 12 configured in accordance with illustrative embodiments of the invention. This figure also has a partial cutaway view to show its vibrating disk 18, and an outline of a member stabilizing a portion of that disk 18 (shown in dashed lines). To further illustrate this embodiment, FIG. 3 schematically shows a rotated, cross-sectional view of the bulk acoustic wave gyroscope of FIG. 2 along line 3-3.

Specifically, this description uses the terms "top," "bottom," and the like for descriptive purposes only. Those terms are used with respect to the frame of reference of FIG. 3. FIG. 2, however, is rotated 180 degrees (i.e., the top is down and the bottom is up) to better show the components. Accordingly, elements identified as "top" elements in FIG. 3, the correct orientation, are on the bottom side of FIG. 2. For example, FIG. 2 shows a top substrate 40 near the top of the structure, while FIG. 3 shows that same top substrate 40 near the bottom of the structure—because FIG. 3 is rotated 180 degrees from the frame of reference figure.

This gyroscope 12 is a two dimensional gyroscope that measures rotational movement about the X-axis and Y-axis shown in FIG. 2. Accordingly, those skilled in the art refer to this type of gyroscope as an X/Y gyroscope, or a two dimensional gyroscope. It nevertheless should be reiterated that illustrative embodiments apply to gyroscopes that measure rotation about its other axes, such as the Z-axis alone, about the X-axis and Z-axis, or about all three axes, among other things. Accordingly, discussion of this specific two-dimensional bulk acoustic wave gyroscope 12 should not limit various embodiments of the invention.

At its core, the bulk acoustic wave gyroscope 12 has a generally planar disk 18 (noted above) that resonates in a flexure mode upon receipt of an electrostatic actuation signal. In particular, during the flexure mode, a bottom electrode 22 (discussed below) produces an electrostatic force that causes portions of the disk 18 to vibrate in and out of the plane of the disk 18. As a bulk acoustic wave gyroscope, however, the crystal lattice of the disk 18 itself vibrates in response to both a rotation and the continued actuation by the noted electrostatic signal. This is in contrast to other types of gyroscopes that have a shuttle/mass vibrating back and forth above a substrate during both actuation and detection phases. To that end, the embodiment shown in FIGS. 2 and 3 has the above noted bottom electrode 22 for actuating/vibrating the disk 18 in a flexure mode at a preselected frequency. As known by those skilled in the art, this frequency can be quite high, such as on the order of about 1-3 Megahertz.

The disk 18 is configured to vibrate in a predetermined manner at the known vibration frequency. For example, the vibration frequency may be the resonant frequency of the disk 18 itself. As such, the disk 18 vibrates in and out of plane in a non-uniform manner. Specifically, parts of the disk 18 may vibrate, while other parts of the disk 18 may remain substantially stable; i.e., the stable portions will vibrate at approximately zero Hertz. In other words, the stable portions substantially do not vibrate at all. The stable portions are known as "nodes 24" and preferably are located generally symmetrically about the top and bottom faces of the disk 18. For example, when vibrating at the resonant frequency, the bottom face of a 200 micron radius disk 18 may have a node 24 that forms a general ellipse about the center of the disk 18. This elliptical node 24 may take on the shape of a circle with a radius of between about ten and fifteen microns.

Rotation about the X-axis or Y-axis causes the shape of the disk 18 to change To detect this change in shape, the gyroscope 12 has a plurality of side electrodes 26 generally circumscribing the disk 18. For example, the cutaway of FIG. 2 shows four side electrodes 26 that can detect this change. More specifically, the side electrodes 26 form a variable capacitor with the side wall of the disk 18. A change in the shape of the disk 18, in the bulk mode, causes at least a portion of its side wall to change its position, thus changing the distance between it and the side electrode 26. This changes the variable capacitance measured by the side electrode 26. It is this capacitance change that provides the necessary movement information.

A plurality of pads 28 formed on the same layer as the bottom electrode 22 electrically connect the bottom and top electrodes 22 and 26 to other circuitry. Off-chip circuitry or on-chip circuitry (not shown) thus detects the noted capacitance change as a changing signal, which includes the necessary information for identifying the degree and type of rotation. The larger system then can take appropriate action, such as controlling the rotation of tires in an automobile for stabilization control, or changing the trajectory of a guided missile.

Naturally, the disk 18 should be supported to function most effectively. To that end, the gyroscope 12 has a bottom substrate 30 mechanically bonded to the bottom of the disk 18. In illustrative embodiments, the bottom substrate 30 is formed from a single crystal silicon wafer and hermetically bonded to the layer having the bottom electrode 22 and pads 28. For example, a ring of seal glass 32, or glass frit, can hermetically seal this bottom substrate 30 to the disk/electrode structure.

The bottom substrate 30 shown in FIGS. 2 and 3 also has a bottom support portion 34 that mechanically connects to the bottom face of the disk 18. In illustrative embodiments, the bottom support portion 34 is connected directly to the node 24 on the bottom face of the disk 18. As noted above, this node 24 substantially does not vibrate when the disk 18 as actuated at its resonant frequency. The bottom support portion 34 can be formed from any number of materials. For example, this structure can be a solid piece of polysilicon, or a part of the layer forming the bottom electrode 22 and seal glass 32. Alternatively, the bottom support can be formed from the same material as the bottom substrate 30—e.g., one or more pedestals formed from a timed etch of the bottom substrate 30. In that case, the bottom support is integral with the bottom substrate 30, and formed from the same material as the bottom substrate 30 (e.g., single crystal silicon). See the discussion below regarding FIG. 6 for additional details.

Conventional micromachining processes may form the disk 18 and layer immediately beneath the disk 18 in any number of known ways. For example, that portion of the gyroscope 12 may be formed from a micromachined silicon-on-insulator wafer (also known as an "SOI" wafer). In that case, the disk 18 may be formed from the top, single crystal silicon layer of the SOI wafer. Moreover, the side electrodes 26 may be formed from deposited polysilicon and electrically connected with the bond pads 28, which may be formed from deposited metal.

As known by those skilled in the art, the top SOI layer is typically much thinner than the bottom layer 36 of the SOI wafer, which also is formed from single crystal silicon. The layer having the bottom electrode 22 (referred to as the "bottom layer 36"), however, is thinner than the layer having the disk 18 (referred to as the "top layer 38"). Although not necessary, illustrative embodiments thin this bottom layer 36 to reduce the profile of the overall sensor, and improve the performance of the bottom electrode 22. For example, the disk 18 may have a thickness of about 50 microns, while the bottom electrode 22 may have a thickness of about 40 microns.

Before developing this bulk acoustic wave gyroscope 12, the inventors experimented with a design that secured only one face of its disk to a substrate of any kind. More specifically, that gyroscope was similar to the gyroscope 12 of FIG. 2, but did not have a top substrate 40 (discussed below).

During testing, the inventors discovered that the signal generated by that gyroscope undesirably was lower than expected. Further analysis and testing identified the source of the problem; namely, the inventors discovered that the top face of that disk vibrated in an unintended manner. Specifically, the parts of the disk that were expected to act as nodes on the top face of the disk still had some vibration component, despite their theoretical zero-vibration behavior.

The inventors responded by stabilizing at least a portion of the node region 24 of the top face of the disk. This stabilization should substantially eliminate undesired vibration in the area of the node 24. In doing so, the inventors improved the output signal and signal-to-noise ratio. Accordingly, the inventors secured a top substrate 40 to the top node region 24 of the disk. To that end, the top substrate 40 may be considered to have a top support portion 42 secured directly to the node region 24 of the top surface of the disk. In a manner similar to the bottom support portion 34, the top support portion 42 may be formed in any number of manners. For example, the top support portion(s) 42 may be formed as an anchor having a silicon-to-silicon bond with the disk 18. Moreover, the top support portion(s) 42, which, like the bottom support s(s) 34, may include a number of separate members, illustratively symmetrically positioned and spaced about the top surface of the disk.

The top substrate 40 also has an annular sealing region 44 that forms a seal with the bottom layer 36 of the disk/lower electrode apparatus. In a manner similar to the bottom substrate 30, the top substrate 40 may not provide a hermetic seal. When both substrates provide a hermetic seal, however, those skilled in the art should expect the disk 18 to be fully protected by the chamber formed by both of the substrates.

Figure 4:
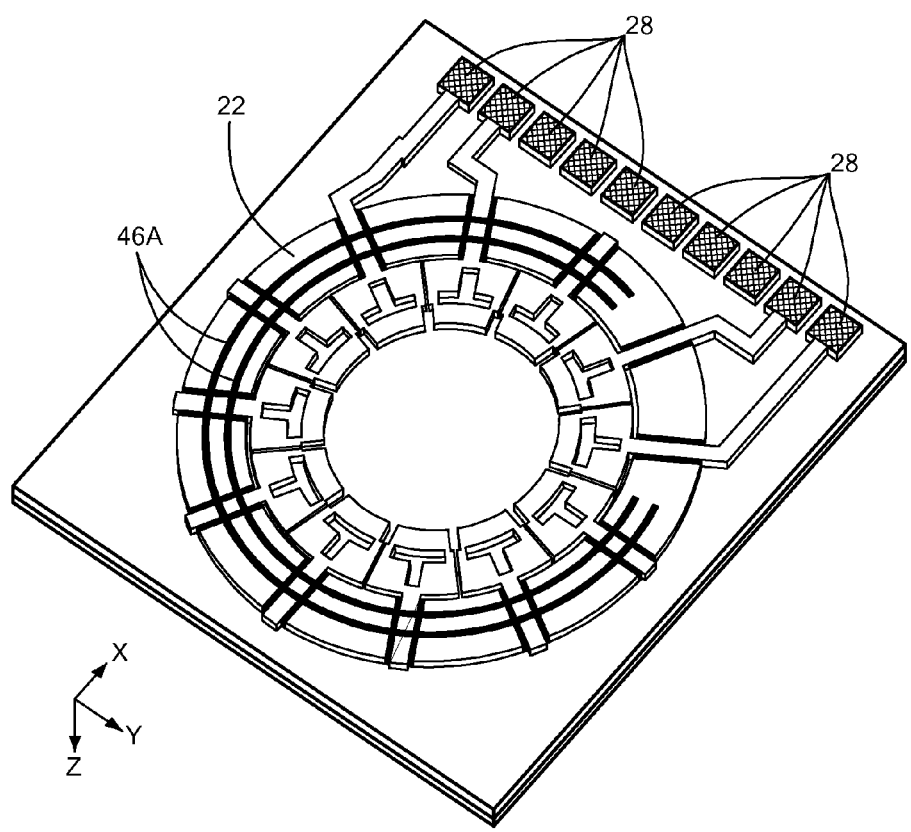
FIG. 4 schematically shows a top perspective view of a bottom electrode in the gyroscope of FIG. 2.
Figure 5:
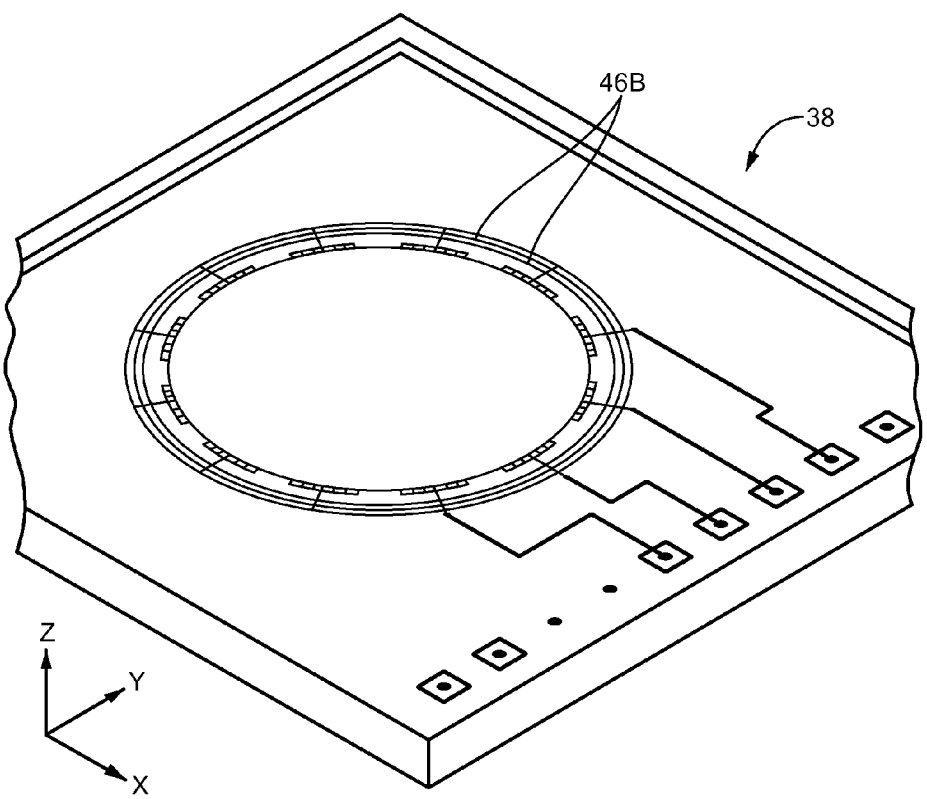
FIG. 5 schematically shows a top perspective view of the device layer, including the resonating/vibrating disk, in accordance with illustrative embodiments of the invention.

FIGS. 4 and 5 show additional details of the gyroscope 12. Specifically, FIG. 4 schematically shows a top perspective view of the bottom electrode/bottom layer 36 of the gyroscope 12 shown in FIGS. 2 and 3, while FIG. 5 schematically shows a top perspective view of the top layer 38 of the gyroscope 12 shown in FIGS. 2 and 3.

As shown in FIG. 4, the bottom electrode 22 may comprise twelve separate electrodes that cooperate to actuate the disk 18 in a flexure mode. Specifically, the bottom electrode 22 shown in FIG. 4 has two sets of six electrodes that each provide opposite force to the disk 18—one set pushes while the other pulls. Both sets alternate (i.e., they are about 180 degrees out of phase) according to the actuation frequency. A first pad controls one set of electrodes, while a second pad controls the second set of electrodes. A pair of generally circular, concentric metallic traces 46A connects the bottom electrodes 22 in the desired manner. More particularly, each of the two traces 46A electrically connects every other electrode to form the two sets.

FIG. 5 shows the electrical connections between the side electrodes 26 and the pads 28, as well as the top face of the disk 18. Unlike the schematic diagram of FIG. 2, this embodiment shows twelve side electrodes 26. In a manner similar to the bottom electrode, three concentric, circular conductive traces 46B electrically connect various combinations of the side electrodes 26 to the pads 28.

Figure 6:
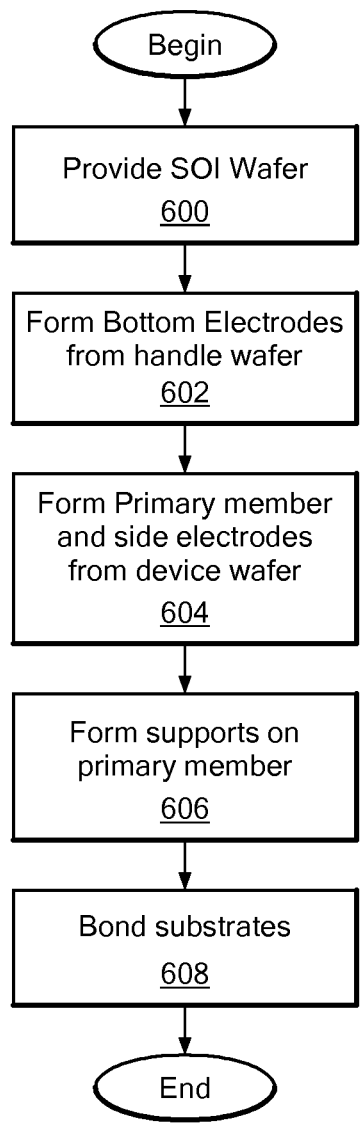
FIG. 6 shows a process of forming a bulk acoustic wave inertial sensor in accordance with illustrative embodiments of the invention.

FIG. 6 shows a process of forming the bulk acoustic wave gyroscope 12 of FIG. 2 in accordance with illustrative embodiments of the invention. It should be noted that for simplicity, this described process is a significantly simplified version of an actual process used to fabricate the inertial sensor of FIG. 2. Accordingly, those skilled in the art would understand that the process may have additional steps and details not explicitly shown in FIG. 6. Moreover, some of the steps may be performed in a different order than that shown, or at substantially the same time. Those skilled in the art should be capable of modifying the process to suit their particular requirements.

The process begins at step 600, which provides an SOI wafer. The next two steps, step 602 and 604, which may be performed either at the same time or in a different order, form the microstructure making up the gyroscope 12. Specifically, step 602 forms the bottom electrode 22 from the handle wafer (a/k/a the top layer 38 of the SOI wafer), while step 604 forms the disk 18 (also referred to as the "primary member") and side electrodes 26 primarily on/from the top layer 38 of the SOI wafer. Micromachining processes also form additional microstructure, such as the traces 46A, 46B, pads 28, and other components in the sensor. As noted above, these steps significantly thin the bottom layer 36 of the SOI wafer. Moreover, they also remove substantially all of the buried oxide layer of the original SOI wafer.

Step 606 then prepares the microstructure for bonding with the top and bottom substrates 40 and 30. Specifically, the process forms a plurality of support members on the top and bottom surfaces of the disk 18—preferably at the site of the nodes 24. Any of a number of different techniques may accomplish this task. For example, among others, the top surface of the disk 18 may be thinned everywhere except on its node(s) 24. In contrast, this step may deposit polysilicon onto the node(s) 24 on the bottom surface of the disk 18.

Alternative embodiments may process both the top and bottom nodes 24 to have the same types of support members 34 and 42. In yet other embodiments, the top surface and/or the bottom surface of the disk 18 are not processed to have support members 34 and 42. Instead, this process may skip step 606 and thus, only processes the top and bottom substrates 40 and 30 (discussed below) to include the support members 34 and 42. Accordingly, discussion of specific types of support members 34 and 42 is not intended to limit all embodiments of the invention.

After forming the above noted portions of the support members 34 and 42, the process bonds the top and bottom substrates 40 and 30 to the microstructure formed by the previous steps (step 608). Specifically, the top substrate 40 may be formed from a single crystal silicon wafer having an etched cavity that fits over the processed top layer 38 of the (former) SOI wafer. This etched cavity forms the above noted annular sealing region 44 of the top substrate 40, which forms a seal with the bottom layer 36 of the disk/lower electrode apparatus. To that end, conventional processes bond the annual seal region to the bottom layer 36 of the SOI wafer. For example, a glass frit 32 may provide a hermetic or non-hermetic seal at that point.

In addition, the interior of the cavity bonds directly with the support portion 42 extending from the disk 18. A glass frit (not shown here) also may make this connection. Alternatively, some of the embodiments that form the support portions directly from the top substrate 40 (e.g., forming the top support portions 42 as pedestals with a timed etch) may simply make a direct silicon-to-silicon bond with the node(s) 24 on the top surface of the disk 18.

The process may bond the bottom substrate 30 to the bottom layer 36 of the processed SOI wafer in a similar manner. For example, a glass frit 32 may couple the bottom substrate 30 about the edges of the bottom layer 36 to provide a hermetic or non-hermetic seal. In addition, a silicon-to-silicon bond, or other bond as discussed above with the top substrate 40, also may secure the bottom substrate 30 to the node(s) 24 and bottom support portions 34 on the bottom surface of the disk 18.

As noted above, the top and bottom substrates 40 and 30 effectively form a chamber that protects the resonating disk 18 during use. Moreover, these substrates act as anchors to mechanically constrain the nodes 24 to substantially prevent undesired vibration, consequently delivering an improved output signal.

Although the above discussion discloses various exemplary embodiments of the invention, it should be apparent that those skilled in the art can make various modifications that will achieve some of the advantages of the invention without departing from the true scope of the invention.

What is claimed is:

1. A bulk acoustic wave sensor comprising:
   a primary member having a top side and a bottom side;
   at least one bottom electrode for actuating the primary member in an out-of-plane flexure mode;
   at least one side electrode for detecting an in-plane bulk mode of the primary member when the sensor is rotated about an axis in the plane of the primary member;
   a bottom substrate; and
   a top substrate,
   the primary member being between the bottom substrate and the top substrate,
   the bottom substrate having a bottom support portion securing the bottom substrate to the bottom side of the primary member,
   the top substrate having a top support portion securing the top substrate to the top side of the primary member.

2. The bulk resonating sensor as defined by claim 1 wherein the primary member is configured to resonate in a flexure mode to cause a given top portion of the top surface to form a stationary node, the top support portion being secured to the given top portion.

3. The bulk resonating sensor as defined by claim 1 wherein the primary member is configured to resonate in a flexure mode to cause a given bottom portion of the bottom surface to form a stationary node, the bottom support portion being secured to the given bottom portion.

4. The bulk resonating sensor as defined by claim 1 wherein the bottom substrate and top substrate form a hermetically sealed chamber to hermetically seal the primary member.

5. The bulk resonating sensor as defined by claim 4 further comprising a plurality of electrodes within the chamber to electrostatically actuate the primary member, the sensor also comprising a plurality of pads electrically connected with the plurality of electrodes, the plurality of pads being outside of the chamber.

6. The bulk resonating sensor as defined by claim 1 wherein the top substrate is formed from a top material, the bottom substrate is formed from a bottom material, the top support being formed from the top material, the bottom support being formed from bottom material.

7. The bulk resonating sensor as defined by claim 1 wherein the sensor comprises a gyroscope.

8. The bulk resonating sensor as defined by claim 1 wherein the bottom substrate comprises a plurality of bottom support portions that are symmetrically arranged with respect to the primary member.

9. A MEMS bulk resonating gyroscope comprising:
   a primary member having a top side and a bottom side;
   at least one bottom electrode for actuating the primary member in an out-of-plane flexure mode;
   at least one side electrode for detecting an in-plane bulk mode of the primary member when the sensor is rotated about an axis in the plane of the primary member;

a bottom substrate secured to the primary member; and
a bottom support portion securing the bottom substrate to the bottom side of the primary member,
the top side of the primary member having a constrained portion that is mechanically constrained to form a stationary node when resonating in the flexure mode and in the bulk mode.

10. The sensor as defined by claim 9 further comprising a top substrate secured to the constrained portion on the top side of the primary member.

11. The sensor as defined by claim 10 further comprising a top support portion securing the top substrate to the constrained portion of the primary member.

12. The sensor as defined by claim 9 wherein the bottom substrate in part forms a chamber for hermetically sealing the primary member.

13. The sensor as defined by claim 12 wherein a top substrate secured to the constrained portion in part forms the chamber.

14. The bulk resonating sensor as defined by claim 12 further comprising a plurality of electrodes within the chamber to actuate the primary member, the sensor also comprising a plurality of pads electrically connected with the plurality of electrodes, the plurality of pads being outside of the chamber.

15. A method of sensing movement, the method comprising:
resonating a primary member in an out-of-plane flexure mode, resonating causing the primary member to have top and bottom portions that form stationary nodes;
securing the bottom portion to a first substrate;
mechanically constraining the top portion while resonating in the flexure mode to substantially eliminate vibrations in the top portion; and
generating a changing capacitance signal in response to movement of the primary member, generating comprising the primary member resonating in an in-plane bulk mode at a given frequency.

16. The method as defined by claim 15 wherein the given frequency is the resonant frequency of the primary member.

17. The method as defined by claim 15 wherein mechanically constraining comprises securing a second substrate to the top portion.

18. The method as defined by claim 15 further comprising reading the changing capacitance signal at a pad that is mechanically secured to the first substrate.

19. The method as defined by claim 15 wherein the primary member is hermetically sealed in a chamber.

20. The method as defined by claim 15 wherein the changing capacitance signal indicates a movement change in at least 2 dimensions.

* * * * *